United States Patent [19]
Kemmochi et al.

[11] Patent Number: 5,807,416
[45] Date of Patent: Sep. 15, 1998

[54] SILICA GLASS MEMBER WITH GLASSY CARBON COATING METHOD FOR PRODUCING THE SAME

[75] Inventors: Katsuhiko Kemmochi, Koriyama; Dietmar Hellmann, Linsengericht; Christian Gebauer, Tokyo, all of Germany

[73] Assignee: Heraeus Quarzglas GmbH, Hanau, United Kingdom

[21] Appl. No.: 714,209

[22] Filed: Sep. 16, 1996

[30] Foreign Application Priority Data

Sep. 14, 1995 [JP] Japan .................................. 7-260925
Sep. 18, 1995 [JP] Japan .................................. 7-262012
Oct. 18, 1995 [JP] Japan .................................. 7-293818

[51] Int. Cl.[6] .......................... C03B 37/00; C03B 13/00; C03C 17/00
[52] U.S. Cl. ............................ 65/32.4; 65/601; 65/60.3; 65/60.6; 65/93; 65/95; 428/426; 428/448; 428/698
[58] Field of Search .................... 428/426, 448, 428/698; 65/32.4, 60.1, 60.3, 60.6, 92, 111

[56] References Cited

U.S. PATENT DOCUMENTS

| | | | |
|---|---|---|---|
| 4,210,431 | 7/1980 | Bachman et al. | 65/3 |
| 5,147,432 | 9/1992 | Edmonston et al. | 65/3.11 |
| 5,320,659 | 6/1994 | Ishiguro et al. | 65/3.12 |
| 5,378,527 | 1/1995 | Nakanishi et al. | 428/216 |
| 5,403,368 | 4/1995 | Takahashi et al. | 65/17.2 |
| 5,506,038 | 4/1996 | Knapp et al. | 428/216 |
| 5,624,760 | 4/1997 | Collins et al. | 428/426 |
| 5,681,609 | 10/1997 | Kitayama et al. | 427/129 |

*Primary Examiner*—Peter Chin
*Assistant Examiner*—Jacqueline A. Ruller
*Attorney, Agent, or Firm*—Felfe & Lynch

[57] ABSTRACT

A silica glass member shows a glassy carbon coating wherein a surface of a silica glass substrate of the silica glass member shows a mean surface roughness ($R_a$) in a range of 0.03 μm to 2 μm and it is coated with a glassy carbon coating. The member is manufactured by chemically roughening the substrate to a surface roughness in the above recited range; coating the surface of the silica glass substrate with an organic raw material containing carbon, curing and thereafter carbonizing the film of the organic raw material by forming a glassy carbon coating.

7 Claims, 1 Drawing Sheet

[ Fig. 1 ]
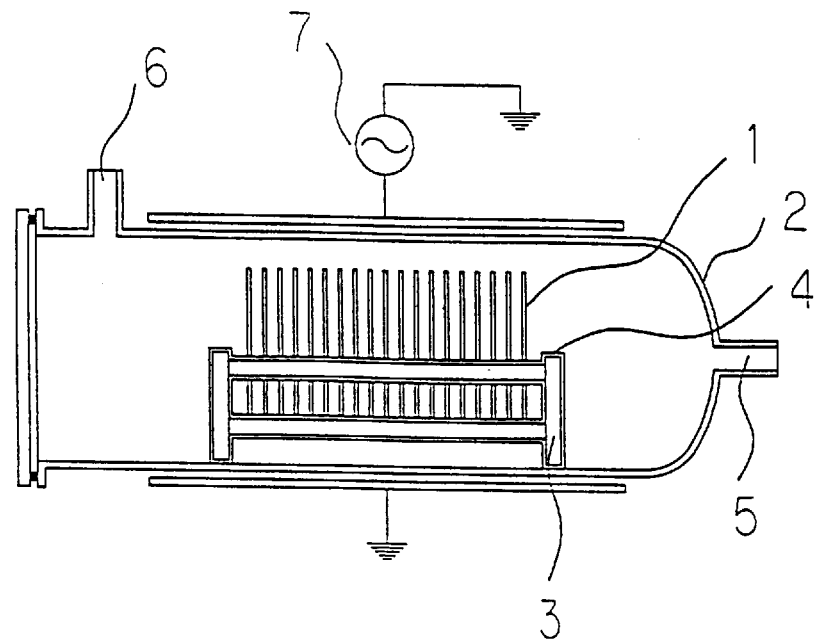
[ Fig. 2 ]
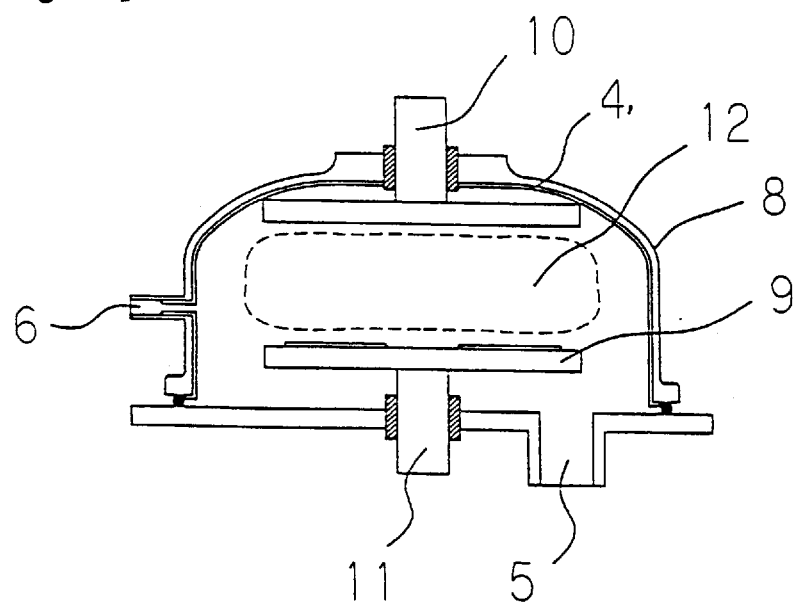

SILICA GLASS MEMBER WITH GLASSY CARBON COATING METHOD FOR PRODUCING THE SAME

INDUSTRIAL FIELD

The present invention relates to a silica glass member and more particularly relates to a silica glass jig which is used in a film deposition process of semiconductor device fabrication by means of a vapor-phase chemical reaction and it relates to a method of manufacturing the same silica glass member.

PRIOR ART

The so-called chemical vapor deposition method (hereinafter referred to as the CVD method) has been used in semiconductor device fabrication, in which a chemical reaction occurs in a vapor phase producing silicon, silicon nitride, silicon dioxide or the like deposited in the form of a thin film on a wafer. In a CVD film deposition method, silica jigs such as a furnace tubes, wafer boats and the like are well used and, therefore, a film material formed in the CVD method is deposited on the surface of the aforementioned silica jigs as well as on the surface of a wafer. Among materials for film deposition, a film of silicon or silicon nitride has a nature to remain stably adhered to a surface of silica glass at a temperature of hundreds of degrees at which film deposition is carried out. When a temperature of the film Is cooled to room temperature, however, a tensile stress is generated in the bulk of the film on the surfaces of the silica jigs because of the thermal expansion coefficient of the material of the film being larger than that of silica glass. Thus generated tensile stress causes cracking in the bulk of the film the material of which is usually rigid and brittle. Silicon dioxide should be in principle a good material for film deposition the bulk of which remains free of cracking through a film deposition process, since silicon dioxide is the same material as silica glass which is the material of silica glass jigs and no difference in thermal expansion coefficient exists naturally. If a silica film is deposited from TEOS (tetra-ethyl orthosilicate) by means of a CVD method, the chemical composition of the material of the silica film is not stoichiometrically correct as deposited and, therefore, the stoichiometry of the film material is normally recovered close to the theoretical relation in a following heat treatment. During such a heat treatment, contraction occurs in the bulk of the film material and cracks follows the contraction. Since good adhesion is attainable between silicon, silicon nitride or silicon dioxide and silica glass cracks generated in the bulk of a film of such material advance into the bulk of a silica glass substrate. For example, even If a film has a thickness of less than 10 $\mu$m it is not rare that a silica glass tube of 3 mm in thickness or a silica glass rod of 6 mm in diameter breaks down. Therefore it has become common that the above-mentioned material of a film depositing on a silica glass member is removed by cleaning the surface by etching in hydrofluoric acid before a tensile strength in the bulk of the film grows too large. In this case, however, the disadvantage occurs that an operating ratio to a scheduled working time of an apparatus is lowered and then the production cost is raised because of frequent cleanings of the jig. Moreover the dimensional precision of the glass member gets more and more degraded during etching.

In order to solve the above mentioned problem concerning the decreasing of dimensional precision it has been proposed in unexamined Japanese Patent Application No. Sho 62-134936, to apply onto the surface of a silica glass jig a coat containing a material which is resistive to corrosion by hydrofluoric acid aqueous solution. Such a corrosion-resistant material is silicon nitride, polycrystalline silicon, amorphous silicon or silicon boride. A corrosion-resistant material is used to prevent corrosion of the surface which occurs in cleaning with hydrofluoric acid aqueous solution by uniformly coating the surface of the jig therewith. The lifetime of a jig is extended by such a corrosion-resistant coat, since loss by corrosion is decreased. However such a corrosion-resistant coat shows a problem if the coat is subjected to mechanical damages. For example damages are caused by direct contact between a wafer inserted into the wafer slot opening in a wafer boat. In the region of such mechanical damages the silica glass is etched very fast resulting in holes and the damages furthermore entails generation of particles, which naturally pollute the wafer.

SUMMARY OF THE INVENTION

It is therefore an object of the present invention to avoid these problems by providing a silica glass member, especially a particle-free jig, having an excellent corrosion-resistance to a hydrofluoric acid aqueous solution. It is a further object of the invention to provide a method of manufacturing such a silica glass member.

The problem of breaking down of a silica glass member is solved by coating a silica glass substrate of the silica glass member with glassy carbon. The surface of a glassy carbon coating has a high hardness and only few particles and little impurity came out from the surface.

However the glassy carbon coating formed on a smooth surface of a silica glass substrate peeled off and fell down as large thin pieces together with parts of a deposited film during a CVD treatment of semiconductor wafers and the falling pieces caused contamination of semiconductor devices being manufactured. According to the invention adhesive strength of a glassy carbon film to the silica glass substrate is optimized by roughening the surface of the silica glass substrate in a range of 0.03 $\mu$m to 2 $\mu$m surface roughness ($R_a$) before coating the surface with the glassy carbon coating.

The glassy carbon is a carbon that has a glassy state which is produced in such a manner as described for example in "Carbon" No. 45 (1966) pages 19–25. A thermosetting resin, such as phenol resin or the like, or preferably a condensation copolymer of furfural and phenol, is used as a raw material and one of them is applied to the surface of a silica glass substrate for CVD film deposition to form a film and then the film is carbonized. A carbonizing treatment of the raw materials is carried out in an inert gas atmosphere, preferably in an argon gas atmosphere at a temperature equal to a deformation temperature of silica glass or lower, that is, at a temperature of about 1100° C. or lower.

In manufacturing of a silica glass member for CVD film deposition of the present invention it is an indispensable condition to roughen a surface of a silica glass substrate of the silica glass member. A surface roughness of the surface of the substrate is selected in a range of 0.03 $\mu$m to 2 $\mu$m. The surface roughness $R_a$ corresponds to an arithmetic mean roughness value determined according to DIN 4768. Even when a tensile stress is generated in the bulk of a film deposited on a surface, cracks produced in the film can advance into a glassy carbon film, but are prevented from advancing further into a silica glass substrate. In the case of a surface roughness larger than 2 $\mu$m, an adhesive strength is too large and cracks produced in the glassy carbon film continue to advance into the bulk of the silica glass substrate, which damages the silica glass substrate. Furthermore the mechanical strength of the substrate is degraded because the bulk of the substrate suffers from damage. Therefore a high surface roughness could be detrimental if an high mechanical strength of the substrate is required. In such cases the mean surface roughness $R_a$ should be lower as 2 μm, preferably about 0.30 μm. On the other hand, in the case of a surface roughness of less than 0.03 μm, adhesive strength is not large enough to prevent peeling off of the glassy carbon coating.

According to the present invention, a raw material for glassy carbon is applied to a surface of a silica glass substrate having a surface roughness of in a range mentioned above and then a film of the raw material formed on the surface Is carbonized by heating to form a glassy carbon coating having a proper adhesive strength. In an actual case, the thickness of a glass carbon coating is preferably thin, since cleaning is required when a total thickness of a deposited film in a CVD process and a glassy carbon film combined reaches a certain value, which is about 15 μm. In such consideration, a thickness of the glassy carbon coating is selected in a range of 0.5 μm to 8 μm. Uniformity in thickness of the glassy carbon coating is not obtained with a thickness of the coating less than 0.5 mm and on the other hand, a thickness larger than 8 μm of the glassy carbon is not economical, since an application process of a raw material on the surface of the substrate and a following carbonization process have to be repeated in many times of runs of the combination. More preferably the thickness of the glassy carbon coating is selected in a range of 0.7 μm to 2.5 μm.

For roughening a surface of a silica glass substrate, mechanical means such as sand blasting, a chemical treatment and so on are known. The mechanical means are apt to produce cracks in the bulk of the silica glass substrate and, as a result, contaminants are incorporated in the cracks and the incorporated contaminants are released during a treatment of semiconductor devices to contaminate them.

In contrast with the mechanical means, the chemical treatment causes no cracks on the surface of the silica glass substrate, naturally no chance of contamination occurs and besides the chemical treatment can be effectively used for the purpose of roughening a surface. An adhesive strength of the glassy carbon coating Is roughly proportional to a surface roughness. An adhesive strength of the glassy carbon coating is most properly adjusted with the aid of such proportionality in respective film deposition conditions of such a film deposition material as silicon, silicon nitride or silicon dioxide. When the most proper adhesive strength is selected, even if cracks are produced in a deposited film in a CVD process and they propagate into the bulk of a glassy carbon coating, only peeling off of the glassy carbon coating occurs at the interface with the silica glass substrate but cracks in the bulk of the glassy carbon coating are prevented from advancing into the bulk of the silica glass substrate. As a result, even when a thickness of the deposited film increases over 10 μm, the bulk of the silica glass substrate remains crack free and the silica substrate can continue to be used further with no cleaning. With such most proper adhesive strength, an operating ratio to a scheduled working time of an apparatus can be increased.

Liquids used in a chemical treatment aforementioned are mixtures of ammonium fluoride and acetic acid or, when occasion demands, preferably of hydrogen fluoride and water both as additional ingredients to the same ingredients. If a greater surface roughness of a surface of a silica glass substrate is desired to be produced in a chemical treatment, it is recommendable to substitute some of hydrogen fluoride for part of ammonium fluoride in the mixture. The hydrogen fluoride is replaced with hydrofluoric acid, which is an acid comprising 50 wt % of hydrogen fluoride and the rest of water.

In view of a high corrosion resistance a silica glass member has been found advantageous showing a corrosion-resistant undercoat arranged between the substrate and the glassy carbon coating.

Such a silica glass member has a layered structure in a surface portion comprising an undercoat of a corrosion-resistant nature to a hydrofluoric acid aqueous solution and a glassy-carbon top coat.

As materials for forming such an undercoat silicon nitride, polycrystalline silicon, amorphous silicon, silicon boride and the like are suitable. Deposition of the coat made of a material or a combination of the materials named above is carried out by feeding a gas of a raw material or raw materials selected from the group consisting of silane, disilane, diborane and combinations thereof to a zone having conditions of a reduced pressure in a range of 0.1 Torr to 1.0 Torr and a temperature in a range of 500° C. to 900° C. An adhesive strength of each deposited coat is preferably enhanced by forming a surface roughness on the surface of the substrate of the silica glass member before coating.

A thickness of the undercoat is preferably in a range of 0.5 μm to 3 μm. If a thickness of the undercoat is less than 0.5 μm, a degree of corrosion-resistivity of the glass member is too low. On the other hand, if a thickness of the undercoat is more than 3 μm, an undercoat formed on the substrate is broken down due to a tensile stress generated in the bulk of the undercoat, since a difference between thermal expansion coefficients of the substrate and the undercoat is large and besides duration of a silica glass jig in use is shortened by penetration into the bulk of the substrate of a corrosive liquid through gaps formed the breakdown of the undercoat.

A silica glass member according to the present invention is manufactured by means of a method which comprises the following steps of: roughening a surface of a silica glass substrate, coating the roughened surface with an organic raw material containing carbon by forming a film of the organic material, curing the film and carbonizing it in an inert gas atmosphere by forming the glassy carbon coating.

Suitable materials for forming the film comprise of such thermosetting resins as furfural resin, phenol resin or a condensation copolymer between them. The curing of the film is accomplished by heat treatment in an inert gas atmosphere, preferably in an argon gas atmosphere, at a temperature less than a deformation temperature of silica glass, or in other words less than about 1100° C. Among materials forming a top coat, a condensation copolymer of furfural and phenol is especially preferred. A thickness of the glassy carbon coat is preferably in a range of 0.7 μm to 2.5 μm.

When roughening of the surface is performed in a chemical treatment the silica glass substrate is immersed in a chemical treatment liquid for some hours and then the silica glass substrate is rinsed in water.

A surface treatment liquid may include the precipitant of an ingredient, since the precipitant supplements with some of the ingredient by dissolution and the supplement prevents degradation of the liquid efficacy. In the case of an ingredient ratio of more than 15 mol of hydrogen fluoride to one mol of ammonium fluoride, roughening of the surface does not occur. On the other hand, in the case of an ingredient ratio of less than 0.2 mol of hydrogen fluoride to one mol of ammonium fluoride, ratios in the range cannot be used in a practical sense, since etching rates are too slow and surface roughness are too small though surface roughening occurs. In the case less than 25% by weight of ammonium fluoride and hydrogen fluoride combined, roughening of the surface occurs with difficulty. In the case more than 50% by weight of water, a roughening speed of the surface is slow and an amount of a precipitant is lessened in a treatment liquid, though it is economically recommendable to use more of water. In the presence of water, balances between chemical substances in a treatment liquid can be closely adjustable and besides a number and sizes of deposits, a growth speed and an etching rate are arbitrarily changeable. Acetic acid is an indispensable ingredient in the chemical treatment liquid. In the presence of acetic acid, roughening of the surface of a silica glass substrate can be effectively carried out. In the case less than 10% by weight of composition of acetic acid, a surface roughness on the surface is neither effectively formed nor large enough in value. Ammonium hydrogen fluoride which is a reagent including hydrogen fluoride and ammonium fluoride at a ratio of 1:1 is preferably used in preparation of an aforementioned surface treatment liquid due to easy handling.

A silica glass substrate is treated in such a manner that it is simply left immersed in a surface treatment liquid for 2 hr to 6 hr, or preferably 3 hr to 4 hr. A uniform surface roughness is formed on the surface of the silica glass substrate and looks white in color.

In this way, the silica glass substrate having a desired surface roughness in a range of 0.03 $\mu$m to 2 $\mu$m can be obtained.

In case that a generation of pin holes occurs in a glassy-carbon top coat nevertheless a long duration of a top coat in use can be expected with no corrosion of the silica glass substrate by a hydrofluoric acid aqueous solution, if there is provided a corrosion-resistant undercoat under the top coat. What's better, particle generation from an undercoat is prevented by coverage of a glassy-carbon top coat. Therefore, a silicon wafer in a heat treatment becomes free from particle pollution. A combination of a silicon undercoat and a glassy-carbon top coat is a best choice because of no generation of particle pollution.

EXAMPLES

Examples of the present invention will be described in detail. It is to be expressly understood that the details described in the examples are shown only for the purpose of illustration and, not restricted to define the scope of concepts of the present invention, unless specially stated.

BRIEF DESCRIPTION OF THE DRAWINGS

FIG. 1 is a schematic view in longitudinal section of a plasma etching apparatus having a silica glass chamber and a silica glass wafer boat with a glassy carbon coating, FIG. 2 shows a schematic view in vertical section of a reactive ion etching apparatus (RIE) including a silica glass chamber having an inner wall with a glassy carbon coating.

Example 1

FIG. 1 shows a silica glass chamber, 2 having an gas exhaust port 4, a gas inlet port 6, and an RF electric source or a high frequency electric source 7.

A silica glass wafer boat 3 was manufactured in such a process comprising the steps of: shaping a silica glass body into a silica substrate of a desired shape; removing contaminants adhered to a surface under influence of the shaping step by hydrofluoric acid; smoothing fine surface recesses and protrusions by a flame; immersing the silica glass substrate in a treatment liquid of a composition of 22.1% by weight of hydrogen fluoride, 20.4% by weight of ammonium fluoride, 35.4% by weight of acetic acid and 22.1% by weight of pure water for 4 hours to roughen the surface of the silica glass substrate to a surface roughness of 11 $\mu$m expressed in mean roughness ($R_a$) according to DIN 4768; applying a condensation copolymer resin of furfural and phenol on the substrate to form a film of the copolymer resin thereon; hardening the film; and carbonizing the film by heating it up to a maximum of 1100° C. in an argon atmosphere.

Thus obtained silica glass boat 3, which is a jig, was used in such a way that semiconductor wafers 1 were contained in the boat 3, the wafers 1 were inserted in the silica glass chamber 2 together with the boat 3 and the wafers were etched with a plasma of a halogenohydrocarbon-based gas such as $CF_4$ or the like. A glassy brilliance of the surface of the silica glass wafer boat 3 was not lost in any degree after the plasma etching and no particle contamination of the wafers 1 occurred.

Resistance of a silica glass wafer boat 3 against inactive ions sputtering was confirmed by measuring a sputtering rate in argon gas RF sputtering on a small piece sample from the wafer boat 3. The sputtering speed was as small as about one fifth that of aluminium oxide which is typical of highly sputtering-resistive materials. For comparison, the same measurement was conducted on the surface of a small piece sample of silica glass, which had no coating, and the sputtering speed was measured to be as large as about 5 times that of aluminium oxide.

Example 2

For proving the effect of an undercoat made of silicon the substrate of the silica glass boat 3 after etching as described above was introduced into the silica glass chamber 2 for a treatment at a temperature of 63020 C. under a reduced pressure of 0.2 Torr and exposed to silane gas for 100 min. A silicon film of a thickness of 2.8 $\mu$m was deposited on a surface of the substrate of the wafer boat 3. The coated substrate of the wafer boat 3 was dipped into a solution comprising furfural and phenol at a mol ratio of 2 to 1 and lifted up from the solution to form a film thereon. The film was hardened by drying and then heated for carbonization of the film up to a maximum temperature of 1100° C. in an argon atmosphere to form a glassy-carbon top coat 4 of a thickness of 1 $\mu$m.

Semiconductor wafers 1 were placed in the wafer boat 3 and the wafers 1 received a low pressure CVD treatment for deposition of silicon thereon. Neither particle pollution nor peeling-off of the glassy-carbon top coat occurred. The wafer boat 3 was cleaned several times in a hydrofluoric acid solution, but no enlargement in size of a groove and a hole originally formed in the boat 3 were observed, which means the boat was a dimensionally stable jig.

Example 3

In FIG. 2 the designation number 1 indicates semiconductor wafers, 8 indicates a silica glass, chamber, 9 indicates a silica glass wafer supporting jig, 4 indicates a glassy carbon coating, 5 indicates a gas exhaust port, 6 indicates a gas inlet port, 10 indicates an anode, 11 indicates a cathode and 12 indicates a plasma. The gas atmosphere in the chamber 2 was a mixture of hydrogen gas and carbon tetrachloride ($CF_4$) the latter of which was a main constituent. The inner wall surface of the silica glass chamber 9 was roughened by immersing in a treatment liquid having a composition of 23.6% by weight of hydrogen fluoride, 17.4% by weight of ammonium fluoride, 35.4% by weight of acetic acid and 23.6% of pure water for 4 hours.

The appearance of the inner wall surface of the chamber 8 became a uniformly white surface after the treatment and the surface roughness was measured at 0.9 $\mu$m mean roughness ($R_a$). A condensation copolymer resin of furfural and phenol was applied on the roughened inner wall surface to form a film of the copolymer resin thereon as described above and the film was carbonized by heating it to a maximum of 1100° C. after hardening. A glassy carbon coating 4 was completed in such a way. Thus obtained glassy carbon coating was a film having a uniform thickness across the whole surface, though a few pin holes were observed in the coating. In a practicability test, the glassy carbon coated chamber 8 received no damage by a plasma and successfully performed a good etching process.

A silica glass member according to the present invention has a glassy carbon coating on the surface of the substrate thereof and is a durable silica glass member of no generation of particles therefrom, the surface hardness of the coating being high and besides the coating being neither sputtered nor roughened by a plasma.

Examples 4–7

A glass blowing technique was applied to a silica glass member to manufacture furnace tubes for low pressure CVD and wafer boats. They were immersed in a chemical treatment liquid of a composition shown in Table 1 for 2 hr to 5 hr and rinsed with water. A surface roughness of thus produced silica glass substrate in each example is also shown in Table 1, in which each surface roughness is expressed in mean roughness ($R_a$). The silica glass substrates were coated with a condensation copolymer produced from furfural and phenol and after a film of the condensation copolymer was hardened, each hardened film was carbonized by heating up to a maximum temperature of 1100° C. in an argon atmosphere to attain a glassy carbon coating of 0.8 $\mu$m in thickness. Thus attained jigs were used in a low pressure CVD process for silicon deposition and at those times, no crack occurred in the bulk of each of the silica glass substrates even with silicon deposition having a thickness of 15 $\mu$m. On the other hand, with a silica glass jig having no glassy carbon in use in the aforementioned processes, every time when a thickness of a deposited silicon film became 8 $\mu$m, a cleaning process had to be repeatedly conducted in order to prevent propagation of cracks into the bulk of the silica glass substrate.

TABLE 1

| | Treatment liquid composition (wt. %) | | | | Immersion | Roughness |
|---|---|---|---|---|---|---|
| | Water | HF | NH$_4$F | Acetic acid | (hr) | $R_a$ ($\mu$m) |
| Exam. 4 | 0.0 | 0.0 | 64.5 | 35.5 | 2 | 0.04 |
| Exam. 5 | 0.0 | 0.0 | 64.5 | 35.5 | 5 | 0.08 |
| Exam. 6 | 2.8 | 2.8 | 59.0 | 35.5 | 2 | 0.12 |
| Exam. 7 | 2.8 | 2.8 | 59.0 | 35.5 | 4 | 0.20 |
| Comp. Ex. 1 | 22.1 | 22.1 | 20.4 | 35.4 | 4 | 2.10 |

Comparative Examples 1 to 2

As in the examples 4 to 7, low pressure furnace tubes and wafer boats were prepared by means of a glass blowing technique. Such silica glass jigs as just mentioned were immersed in a treatment liquid of an ingredient composition as shown in a space named Comp. Exam. 1 of Table 1 to form a surface roughness. Glassy carbon coatings were formed, as in the example 4, on the respective surfaces of thus chemically treated jigs.(Comparative example 1) and on jigs each having a smooth surface which had not been treated (Comparative example 2). The jigs having the glassy carbon coatings were all tested in a low pressure CVD treatment for silicon deposition as done in the example 4. Cracks were propagated as far as into each bulk of the silica glass jigs of the comparative example 1 and large thin pieces of a size of several mm across were peeled together with silicon depositions off the jigs of the comparative example 2.

A silica glass jig of the present invention has a glassy carbon coating on the surface thereof and a deposited film in a CVD process is stable and free from breaking down or falling off thereof even when a thickness of the deposited film exceeds 10 $\mu$m. In addition, film deposition on a semiconductor device in a CVD process is efficiently carried out with a good operating ratio to a scheduled working time of an apparatus used therefor. The jig is manufacture by means of an easy and industrially effective method comprising the steps of: coating a glassy carbon raw material on a surface of a substrate of a jig, which has been roughened to a surface roughness in a range, and then carbonizing a film of the glassy carbon raw material.

We claim:

1. A silica glass member, comprising a silica glass substrate coated with glassy carbon with a thickness in a range of 0.5 $\mu$m to 8 $\mu$m, wherein the surface roughness ($R_a$) of the substrate is in a range of 0.03 $\mu$m to 2 $\mu$m.

2. A silica glass member according to claim 1, wherein the thickness of the glassy carbon coating is in a range of 0.7 $\mu$m to 2.5 $\mu$m.

3. A silica glass member according to claim 1, wherein the surface roughness of the substrate is formed by a chemical treatment.

4. A silica glass member according to claim 1, wherein a corrosion-resistant undercoat is arranged between the substrate and the glassy carbon coating.

5. A silica glass member according to claim 4, wherein said undercoat consists of at least one selected from the group consisting of silicon, silicon nitride, and silicon boride.

6. A method of producing a silica glass member having a glassy carbon coating, comprising the following steps:
 a) roughening a surface of a silica glass substrate, by chemical treatment to a range of 0.03 $\mu$m to 2.0 $\mu$m,
 b) forming a film on said surface by coating the surface with an organic raw material containing carbon, wherein the thickness of the film is in the range 0.5 $\mu$m to 8 $\mu$m,
 C) curing the film and
 d) carbonizing the film in an inert gas atmosphere.

7. A method according to claim 6 further comprising coating the substrate with a corrosion resistant undercoat subsequent to roughening and prior to forming said film.

* * * * *

UNITED STATES PATENT AND TRADEMARK OFFICE
CERTIFICATE OF CORRECTION

PATENT NO. : 5,807,416
DATED : September 15, 1998
INVENTOR(S) : Katsuhiko Kemmochi, et al.

It is certified that error appears in the above-identified patent and that said Letters Patent is hereby corrected as shown below:

On the cover page, in the section labeled References Cited, U.S. PATENT DOCUMENTS, line 2, change "Edmonstion" to - - Edmonston - -.
In column 6, line 38, change "63020 C" to - - 630° - -.

Signed and Sealed this

Twenty-first Day of November, 2000

Attest:

Q. TODD DICKINSON

*Attesting Officer*  *Director of Patents and Trademarks*